(12) United States Patent
Liu (10) Patent No.: US 10,699,059 B2
(45) Date of Patent: Jun. 30, 2020

(54) CHARACTER UPDATING METHOD AND APPARATUS

(71) Applicant: TENCENT TECHNOLOGY (SHENZHEN) COMPANY LIMITED, Shenzhen, Guangdong (CN)

(72) Inventor: Haibo Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 431 days.

(21) Appl. No.: 15/184,552

(22) Filed: Jun. 16, 2016

(65) Prior Publication Data

US 2016/0299877 A1  Oct. 13, 2016

Related U.S. Application Data

(63) Continuation of application No. PCT/CN2015/080886, filed on Jun. 5, 2015.

(30) Foreign Application Priority Data

Jun. 6, 2014  (CN) .......................... 2014 1 0251209

(51) Int. Cl.
 *G06F 40/109* (2020.01)
 *G06F 16/11* (2019.01)
 *G06F 40/126* (2020.01)

(52) U.S. Cl.
 CPC .......... *G06F 40/109* (2020.01); *G06F 16/116* (2019.01); *G06F 40/126* (2020.01)

(58) Field of Classification Search
 CPC .............................. G06F 17/214; G06F 40/109
 See application file for complete search history.

(56) References Cited

U.S. PATENT DOCUMENTS 5,526,477 A * 6/1996 McConnell ............ G06K 7/143
                                                         345/467
6,055,534 A * 4/2000 Nishino ................. G06F 16/10
(Continued)

FOREIGN PATENT DOCUMENTS

CN       101083817 A      12/2007
CN       101369953 A      2/2009
(Continued)

OTHER PUBLICATIONS

English Translation of the Written Opinion of the International Search Authority in international application No. PCT/CN2015/080886, dated Aug. 28, 2015 (3 pages).
(Continued)

*Primary Examiner* — Scott T Baderman
*Assistant Examiner* — Benjamin Smith
(74) *Attorney, Agent, or Firm* — Sughrue Mion, PLLC (57) ABSTRACT

The present disclosure is applicable to the communications field and provides a character updating method and apparatus. The method includes: receiving a character update request sent by a client, the character update request carrying a unicode of a character; searching for a file of which a file name is same with the unicode of the character, the file being configured to store single character data, the single character data being obtained by resolving character data stored in a font into single character data; and sending the found file to the client, so that the client updates, according to the character data in the received file, a corresponding character.

8 Claims, 2 Drawing Sheets

(56) References Cited

U.S. PATENT DOCUMENTS

| | | | | |
|---|---|---|---|---|
| 6,101,576 | A * | 8/2000 | Kobayashi | G06F 12/08 358/1.11 |
| 6,665,842 | B2 * | 12/2003 | Nielsen | G06F 16/9577 715/269 |
| 7,786,994 | B2 * | 8/2010 | Gurcan | G06T 11/203 345/467 |
| 2001/0002471 | A1 * | 5/2001 | Ooish | G06F 3/14 715/205 |
| 2002/0010725 | A1 * | 1/2002 | Mo | G06F 17/214 715/205 |
| 2006/0170684 | A1 * | 8/2006 | Kobayashi | G06T 15/04 345/467 |
| 2006/0282483 | A1 * | 12/2006 | Hachio | G06F 16/16 |
| 2008/0040668 | A1 * | 2/2008 | Ala-Rantala | G06F 3/0482 715/713 |
| 2008/0100623 | A1 * | 5/2008 | Gurcan | G06F 17/2217 345/467 |
| 2010/0088291 | A1 * | 4/2010 | Bhogal | H04N 5/76 707/705 |
| 2010/0088694 | A1 * | 4/2010 | Peng | G06F 9/44505 717/178 |
| 2012/0296888 | A1 * | 11/2012 | Anthony | G06F 16/3322 707/706 |
| 2013/0027406 | A1 * | 1/2013 | Liu | G06F 17/214 345/467 |
| 2014/0143271 | A1 * | 5/2014 | Klotzer | G06F 16/24552 707/769 |
| 2014/0164574 | A1 | 6/2014 | Gao et al. | |

FOREIGN PATENT DOCUMENTS

| | | |
|---|---|---|
| CN | 102289511 A | 12/2011 |
| CN | 102880690 A | 1/2013 |
| CN | 103186644 A | 7/2013 |
| JP | S6316366 A | 1/1988 |

OTHER PUBLICATIONS

International Search Report in international application No. PCT/CN2015/080886, dated Aug. 28, 2015 (4 pages).

Notification of the First Office Action of Chinese application No. 201410250209.3 , dated Oct. 30, 2017, 5 Pages.

* cited by examiner

CHARACTER UPDATING METHOD AND APPARATUS

CROSS REFERENCE TO RELATED APPLICATIONS

This is a continuation application of International Patent Application No. PCT/CN2015/080886, filed on Jun. 5, 2015, which claims priority to Chinese Patent Application No. 201410250209.3 filed on Jun. 6, 2014, the disclosures of which are incorporated by reference herein in their entirety.

FIELD OF THE TECHNOLOGY

The present disclosure belongs to the communications field, and in particular, to a character updating method and apparatus.

BACKGROUND OF THE DISCLOSURE

A character is displayed in a mobile platform via a font in the platform and the mobile platform may display a character in the font. At present, there are more than 30,000 characters in a relatively complete font. However, commonly-used characters only account for ⅕ of the font. In a process of developing a mobile application or game, generally, only the commonly-used characters are integrated into a character package to reduce the size of the character package. After the mobile application or game is published, if it is required to add a new character to a character package, an original character package needs to be replaced.

An existing character updating method is to replace an old complete character package with a newly-downloaded complete character package. However, a common character package has about 8,000 Chinese characters, and after compression, the character package is around 2M. If a 2M or even larger character package is downloaded entirely just because of adding several characters, this not only wastes downloading time but also wastes downloading traffic resources. Moreover, currently, players like to use various leetspeak (leetspeak: many users like to use characters of all shapes or user-defined characters as their names. Because these characters are not commonly-used characters, the characters are generally referred to as leetspeak. The leetspeak changes a lot in shape and is generally unpredictable). Therefore, once a player uses a new character, a character package of an entire program needs to be updated, which costs a lot.

SUMMARY

Embodiments of the present invention provide a character updating method, including:

receiving a character update request sent by a client, the character update request carrying a unicode of a character;

searching for a file of which a name is same with the unicode of the character, the file being configured to store single character data, the single character data being obtained by resolving character data stored in a font into single character data; and sending the found file to the client, so that the client updates, according to the character data in the received file, a corresponding character.

Another objective of the embodiments of the present invention is to provide a character updating method, including:

acquiring a user-defined character;

sending a character update request to a server when there is no character same with the acquired user-defined character in a pre-configured character package, so that the server searches for a file of which a name is same with a unicode of a character according to the unicode of the character, the character update request carrying the unicode of the character, the file being configured to store single character data, and the single character data being obtained by resolving character data stored in a font into single character data; and receiving a file sent by a server and updating, according to the character data in the received file, a corresponding character.

DESCRIPTION OF EMBODIMENTS

To make the objectives, technical solutions, and advantages of the present disclosure clearer, the following further describes the present disclosure in detail with reference to the accompanying drawings and embodiments. It should be understood that the specific embodiments described herein are merely for explaining the present disclosure, but are not intended to limit the present disclosure.

The following describes the technical solutions of the present disclosure with reference to the specific embodiments.

The following exemplary methods of present disclosure are executed at an exemplary server having one or more processors and memory storing programs executed by the one or more processors, and an exemplary client configured to interact with the server. The client has one or more processors and memory storing programs executed by the one or more processors.

Embodiment 1

Figure 1:
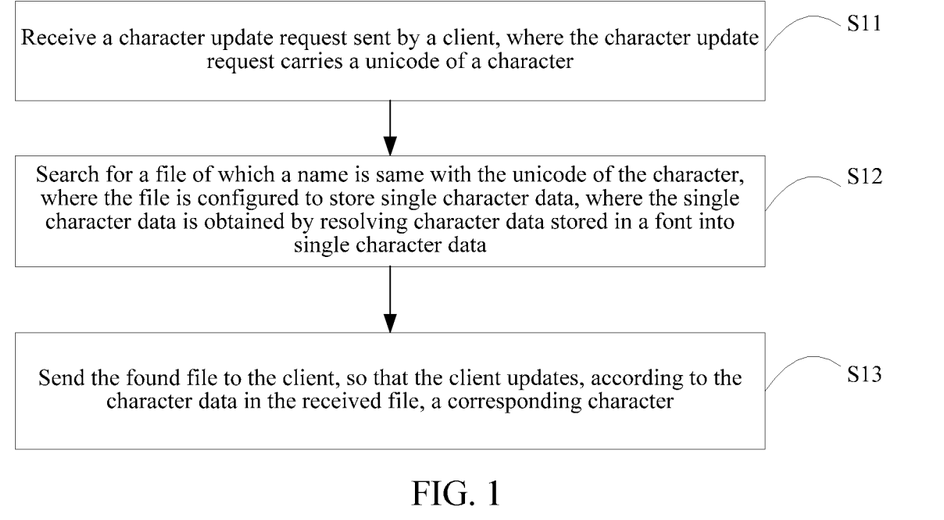
FIG. 1 is a flowchart of a character updating method according to a first embodiment of the present invention.

FIG. 1 is a flowchart of a character updating method according to a first embodiment of the present invention. In this embodiment, a server receives a character update request sent by a client and sends a newly-added character requested by the client to the client. Details are as follows:

Step S11: Receive a character update request sent by a client, where the character update request carries a unicode of a character.

The unicode in this step is a character code used in a computer. Each character in each language corresponds to a unique binary coding. In this step, after parsing the unicode in the character update request sent by the client, a server can exactly distinguish which character that the client requests to update according to the unicode of the character.

As another embodiment of the present invention, before the step of receiving a character update request sent by a client, the method includes:

A1: Resolve a data block that is in a font and comprises multiple character data into single character data, where the data block stores unicodes of multiple characters and character data that corresponds to the unicodes of the characters.

A2: Form each character data into a file, where a name of the file is a unicode of a character.

In step A1 to step A2, the font refers to a font storing relatively complete character information and there are multiple data modules in the font, for example, a data module for recording a character name, a data module for recording a font byte, and a specific data information module for recording each character. The specific data information module for recording each character is generally presented in a data table glyf. The size of the data table glyf and the number of characters correspond to the size of the font and the number of characters, and if there are only 8,000 characters in the font, the data table glyf only includes data information of the 8000 characters. A structure of the data table glyf is based on a unicode of a character and a paragraph of character data corresponding to the unicode of the character, where the character data is information for describing the character, where the information for describing the character includes information such as how each character is formed and how to display each character.

Because information stored in a font is character data corresponding to all characters, when requesting multiple characters, a client can only find character data corresponding to the multiple characters. The character data corresponding to each character is generally within 200 bytes. In the foregoing steps, the character data corresponding to all the characters stored in the font is resolved into independent files. Because the found character data is stored in a data table glyf, the found character data may be resolved according to a storage format of the data table glyf. Character data corresponding to one character is formed into one independent file and a file obtained by resolving is named the unicode of the character, so as to avoid file name duplication. Because character data corresponding to each character is generally within 200 bytes, memory occupied by the file formed of the character data is also about 200 bytes.

The step A1 of resolving a data block that is in a font and comprises multiple character data into single character data specifically includes:

A11: Parse a data block that is in a font and comprises multiple character data; in this step, the data block is parsed by using a character parsing tool and the parsing herein mainly refers to identifying a unicode of a character in a data block.

A 12: Extract, when currently parsed data is a unicode of a character, character data corresponding to the unicode of the character. In this step, because a data table glyf is stored in such an arrangement manner: a unicode of a character and character data, when parsed data is a unicode of a character, character data behind the unicode of the character is directly extracted. For example, there are three character data stored in the data table glyf, the three character data corresponds to unicodes of characters, and assuming that the unicodes of the characters are A, B, and C separately, and the character data is X, Y, and Z separately, a storage structure of the data table glyf is: A: X; B: Y; C:Z. Therefore, when "A" is parsed, character data "X" behind "A" is extracted; when "B" is parsed, character data "Y" behind "B" is extracted; and when "C" is parsed, character data "Z" behind "C" is extracted.

Further, a server configures, in a file downloading server of the server, multiple files storing single character data, so that the client downloads a file storing character data from the file downloading server. For example, assuming that the three character data X, Y, and Z stored in the glyf data block has been resolved into single character data, each character data is stored in a file alone, a file is named the unicode of the character corresponding to the stored character data, and assuming that unicodes of characters that correspond to X, Y, and Z are A, B, and C, a file A, a file B, a file C are obtained after the character data is separately stored in files. Finally, the obtained file A, file B, and file C are configured in the file downloading server of the server.

Step S12: Search for a file of which a name is same with the unicode of the character, where the file is configured to store single character data, where the single character data is obtained by resolving character data stored in a font into single character data.

In this step, the file is named the unicode of the character, and therefore, when the character update request sent by the client is received, the server may be searched according to the unicode of the character carried by the character update request, so as to determine whether a file of which a name is same with the unicode of the character exists. For example, assuming that the server configures, in the file downloading server of the server, the file obtained by resolving the character data, the server searches the file downloading server for a file of which a name is same with the unicode of the character sent by the client.

As a preferable embodiment, if the server does not find the file of which a name is same with the unicode of the character, information related to the character requested by the client is added to the server, for example, the unicode of the character and corresponding character data are added to the data table glyf, so that the server resolves subsequently newly-stored character data and stores the character data obtained by resolving in a file format.

Further, after resolving the subsequently newly-stored character data and storing the character data obtained by resolving in the file format, the server configures the obtained file in a designated path of the file downloading server of the server. For example, assuming that the server stores, in an "existing character folder" of the file downloading server, a file obtained in first-time character data resolution, and the server stores, in an "update character folder" of the file downloading server, a file obtained in second-time and subsequent character data resolution, in this case, when the client requests to update a character again, the server may search the "update character folder" first, which greatly improves a search speed. Certainly, to ensure that a file stored in the "update character folder" is a file updated recently, a file that has been stored in the "update character folder" for a period of time is moved to the "existing character folder". The "existing character folder" and the "update character folder" may be named other names, which is not limited herein.

Step S13: Send the found file to the client, so that the client updates, according to the character data in the received file, a corresponding character.

In this step, the found file of which a name is same with the unicode of the received character is sent to the client, so that the client updates a corresponding character after receiving the file sent by the server.

In this embodiment, after receiving the character update request sent by the client, the server searches for the file of which a name is same with the unicode of the character, and sends the found file to the client, so that the client performs a corresponding character update operation according to the received file. Because the server only sends a file composed of a designated character to the client but does not send a character package composed of an character that has existed in the client and a designated character, and the file composed of the designated character occupies little memory, the request from the client can be responded to quickly and downloading time of the client can be shortened.

Embodiment 2

Figure 2:
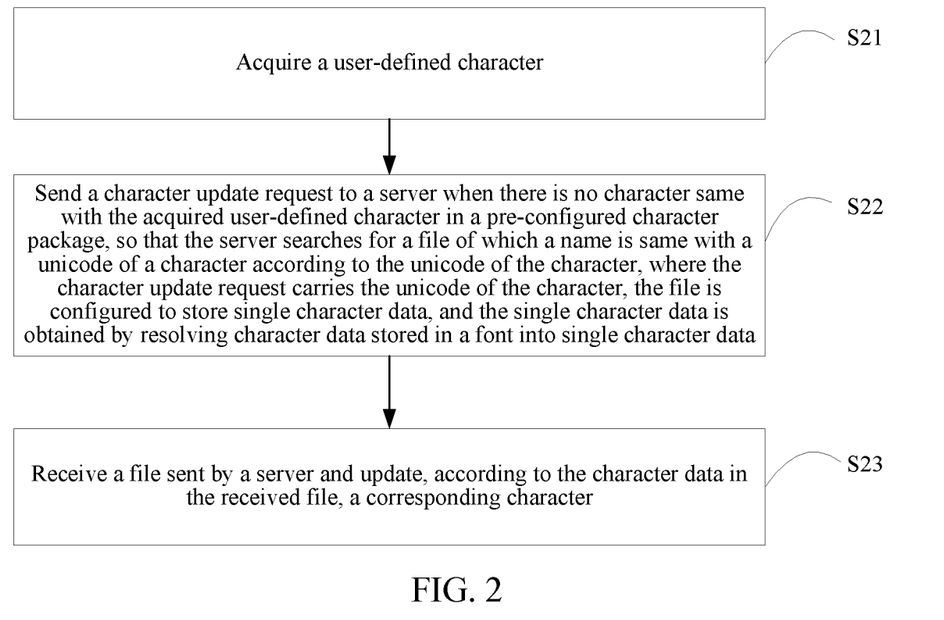
FIG. 2 is a flowchart of another character updating method according to a second embodiment of the present invention.

FIG. 2 is a flowchart of another character updating method according to a second embodiment of the present invention. In this embodiment, a character package is pre-configured in a client and the character package integrates commonly-used characters. When the client receives a new character but the character is not in the pre-configured character package, the client sends a character update request to a server, so as to update an existing character package of the client after a designated character is acquired from the server. Details are as follows:

Step S21: Acquire a user-defined character.

The user-defined character: in a process of developing a mobile application or game, to use a font style that does not exist in a cross-platform system and a display system, generally, a user-defined game engine and a user-defined character are used, that is, a published package contains a font library and a font parsing engine. The characters that are integrated into a package and may be defined by a user are called user-defined characters. In this step, after a user inputs a user-defined character to a mobile application or game installed in the client, the client acquires the user-defined character input by the user and a unicode of the character corresponding to the user-defined character. The user-defined character may be a random character.

As a preferable embodiment of the present invention, after the step of acquiring a user-defined character, the method includes:

determining whether a character existence field has indicated that the received character has existed in a pre-configured character package; determining, if yes, that a character same with the received character exists in the pre-configured character package; and determining, if not, that a character same with the received character does not exist in the pre-configured character package, where the character existence field is set in the character package.

A character existence character is configured for the character package that is in this step and used for describing whether a character exists in the character package. For example, in the character existence field, a unicode of a character is used to represent a character; "1", "yes", or another symbol is used to represent that a character corresponding to the unicode of the character exists in the character package; and "0", "blank", or another symbol is used to represent that a character corresponding to the unicode of the character does not exist in the character package.

Step S22: Send a character update request to a server when there is no character same with the acquired user-defined character in a pre-configured character package, so that the server searches for a file of which a name is same with a unicode of a character according to the unicode of the character, where the character update request carries the unicode of the character, the file is configured to store single character data, and the single character data is obtained by resolving character data stored in a font into single character data.

The pre-configured character package in this step integrates commonly-used characters, is pre-configured when a mobile application or game is published, and is configured on the client with the mobile application or game installed in the client. When determining that the acquired user-defined character is different from all characters integrated in the pre-configured character package, the client sends a character update request to the server, so that the server searches for a file storing a corresponding character. The character update request is sent by using the HTTP protocol.

Step S23: Receive a file sent by a server and update, according to the character data in the received file, a corresponding character.

In this step, the server sends, to the client, a file corresponding to a character of an independent file obtained by resolving, and the client adds character data stored in the received file to the pre-configured character package, so as to update a character.

Further, after the step of receiving a file sent by a server and updating, according to the character data in the received file, a corresponding character, the method includes:

reading into a character display engine and displaying the received character.

The character display engine in this step has functions of parsing description information of a character and presenting a parsing result, and is generally a Freetype rendering engine. In this step, after receiving the file sent by the server, the client reads the file into the character display engine, and the character display engine reads and parses description information of a character, and displays a corresponding character according to the parsing result.

In this embodiment, after acquiring the user-defined character, the client determines whether a character same with the acquired user-defined character exists in the pre-configured character package, and sends, when no same character exists in the character package, the character update request to the server, so as to acquire, from the server, a file same with the unicode of the character carried in the character update request. Because the client only downloads, from the server, a file corresponding to a character that does not exist in the character package and a file corresponding to each character occupies little memory, the client can download a required file from the server quickly, which shortens downloading and installment time, and reduces traffic resources required for downloading.

As a preferable embodiment of the present invention, after the step of sending a character acquisition request to a server, the method includes:

using a preset character to replace the character that does not exist in the pre-configured character package.

In this embodiment, before the client downloads, from the server, a character that needs to be updated, the client replaces the character that needs to be updated by using a default character, and the character that needs to be updated is displayed after the character that needs to be updated is downloaded. For example, before the character is downloaded, a "?" or "blank" is used to replace the character that needs to be updated. Certainly, another symbol may also be used, which is not described herein. Because it also takes some time to load a mobile application or game and a file corresponding to the character that needs to be updated occupies little memory, when loading of the mobile application or game is completed, loading of the file corresponding to the character that needs to be updated also is completed, thereby directly displaying the character that needs to be displayed at a front end and not displaying a replacement character.

Embodiment 3

In order to describe a process of acquiring, by a client, a character from a server and updating, by the client, a character more clearly, descriptions are made below by using a mobile phone game client as an example.

After a game is started, a character display engine (for example, a Freetype rendering engine) is initialized and the character display engine initializes a character package of the mobile phone game client.

The mobile phone game client receives a user-defined character input by a user and the user-defined character is in a to-be-displayed state. The character package is searched for the user-defined character, and if the character package includes the user-defined character, a character display engine is used to render the user-defined character, so as to display the user-defined character; and if the character package does not include the user-defined character, a character update request is sent to the server according to a unicode of the user-defined character, and then, a preset character is used to replace the user-defined character input by the user. After receiving the character update request, the server searches for a file of which a name is same with the unicode of the character; if the file is found, the found file is sent to the mobile phone game client, and the client adds character data stored in the received file to the character package and finally, uses the character display engine to render the character received from the server; and if the server does not find a file of which a name is same with the unicode of the character, information corresponding to the unicode of the character is added to the server.

Embodiment 4

Figure 3:
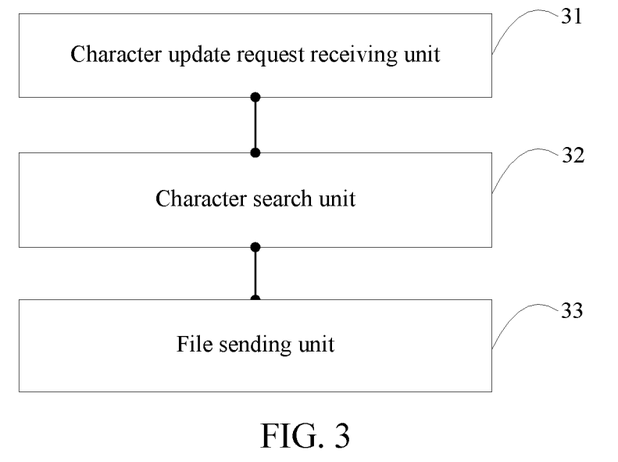
FIG. 3 is a structural diagram of a character updating apparatus according to a fourth embodiment of the present invention.

FIG. 3 is a structural diagram of a character updating apparatus according to a fourth embodiment of the present invention. The character updating apparatus of this embodiment is an apparatus corresponding to the character updating method according to Embodiment 1. For ease of description, FIG. 3 merely shows parts related to the embodiment of the present invention.

The character updating apparatus includes a character update request receiving unit 31, a character search unit 32, and a file sending unit 33.

The character update request receiving unit 31 is configured to receive a character update request sent by a client, where the character update request carries a unicode of a character.

Each unicode of each character in each language is unique.

The character search unit 32 is configured to search for a file of which a name is same with the unicode of the character, where the file is configured to store single character data, where the single character data is obtained by resolving character data stored in a font into single character data.

The searched file stores character data and the file that is named a unicode of a character stores character data corresponding to the unicode. If a server does not find the file of which a name is same with the unicode of the character, information related to the character requested by the client is added to the server, for example, the unicode of the character and corresponding character data are added to a data table glyf, so that the server resolves subsequently newly-stored character data and stores the character data obtained by resolving in a file format. Further, after resolving the subsequently newly-stored character data and storing the character data obtained by resolving in a file format, the server configures the obtained file in a designated path of a file downloading server of the server.

The file sending unit 33 is configured to send the found file to the client, so that the client updates, according to the character data in the received file, a corresponding character.

As another embodiment of the present invention, the character updating apparatus includes a character resolving unit and a character file formation unit.

The character resolving unit is configured to resolve a data block that is in a font and comprises multiple character data into single character data, where the data block stores unicodes of multiple characters and character data that corresponds to the unicodes of the characters. The font herein refers to a font storing relatively complete character information and includes a specific data information module for recording each character, and the module is generally presented by using a data table glyf. A structure of the data table glyf is based on: a unicode of a character and a paragraph of character data corresponding to the unicode of the character. Character data is resolved according to a structure format of the data table glyf.

The character resolving unit includes a character data parsing module and a character data extraction module.

The character data parsing module is configured to parse a data block that is in a font and comprises multiple character data.

The character data extraction module is configured to extract, when currently parsed data is a unicode of a character, character data corresponding to the unicode of the character.

The character file formation unit is configured to form each character data into a file, where a name of the file is a unicode of a character.

The font refers to a font storing relatively complete character information and generally records specific data information of each character by using a data table glyf. If the character requested by the client is not found in the fond, information related to the character requested by the client is added to the font, that is, only information such as how a character is formed and how to display the character is added.

The file obtained by resolving is named the unicode of the character, so as to avoid file name duplication.

Further, the server configures, in the file downloading server of the server, multiple files storing single character data, so that the client downloads a file storing character data from the file downloading server.

In this embodiment, because only a file composed of a designated character is sent to the client but a character package composed of an character that has existed in the client and a designated character is not sent, and the file composed of the designated character occupies little memory, the request from the client can be responded to quickly and downloading time of the client can be shortened.

Embodiment 5

Figure 4:
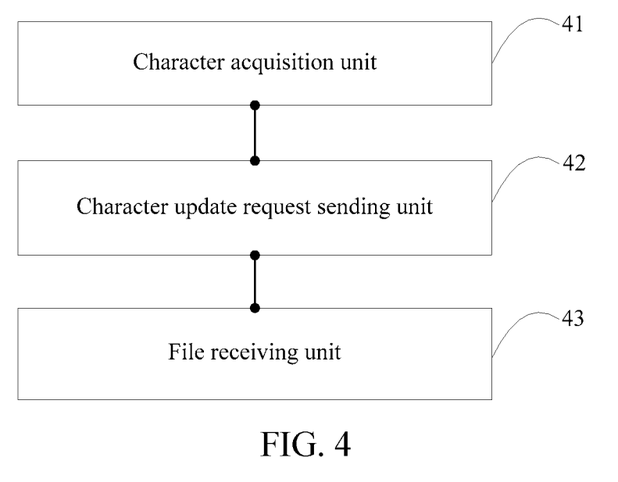
FIG. 4 is a structural diagram of a character updating apparatus according to a fifth embodiment of the present invention.

FIG. 4 is a structural diagram of a character updating apparatus according to a fifth embodiment of the present invention. The character updating apparatus of this embodiment is an apparatus corresponding to the character updating method according to Embodiment 2. For ease of description, FIG. 4 merely shows parts related to the embodiment of the present invention.

The character updating apparatus includes a character acquisition unit 41, a character update request sending unit 42, and a file receiving unit 43.

The character acquisition unit 41 is configured to acquire a user-defined character.

The user-defined character is a random character. When a user inputs a user-defined character, the character acquisition unit 41 acquires a unicode of the user-defined character.

As a preferable embodiment of the present invention, the apparatus includes:

a determining unit, configured to determine whether a character existence field indicates that a received character has existed in a pre-configured character package; determine, if yes, that a character same with the received character exists in the pre-configured character package; and determine, if not, that a character same with the received character does not exist in the pre-configured character package, where the character existence field is set in the character package.

A character existence character is pre-configured in the character package and used for describing whether a character exists in the character package.

The character update request sending unit 42 is configured to send a character update request to a server when there is no character same with the acquired user-defined character in a pre-configured character package, so that the server searches for a file of which a name is same with a unicode of a character according to the unicode of the character, where the character update request carries the unicode of the character, the file is configured to store single character data, and the single character data is obtained by resolving character data stored in a font into single character data.

The character package integrates commonly-used characters, is pre-configured when a mobile application or game is published, and is configured on a client with the mobile application or game installed in the client. The character update request is sent by using the HTTP protocol.

The file receiving unit 43 is configured to receive a file sent by a server and update, according to the character data in the received file, a corresponding character.

As a preferable embodiment of the present invention, the apparatus includes:

a character display unit, configured to read into a character display engine and display the received character.

The character display engine has functions of parsing description information of a character and presenting a parsing result, and is generally a Freetype rendering engine.

As a preferable embodiment of the present invention, the apparatus includes:

a character replacement unit, configured to use a preset character to replace the character that does not exist in the pre-configured character package.

Before a character that needs to be updated is downloaded from the server, a default character is used to replace the character that needs to be updated, and the character that needs to be updated is displayed after the character that needs to be updated is downloaded. For example, before the character is downloaded, a "?" or "blank" is used to replace the character that needs to be updated. Certainly, another symbol may also be used, which is not described herein.

In the embodiment of the present invention, after the user-defined character is acquired, it is determined whether a character same with the acquired user-defined character exists in the pre-configured character package, and when no same character exists in the character package, the character update request is sent to the server, so as to acquire, from the server, a file same with the unicode of the character carried in the character update request. Because only a file corresponding to a character that does not exist in the character package is downloaded from the server and a file corresponding to each character occupies little memory, the client can download a required file from the server quickly, which shortens downloading and installment time, and reduces traffic resources required for downloading.

A person of ordinary skill in the art may understand that all or some of the steps of the foregoing embodiment methods may be implemented by a program instructing relevant hardware. The program may be stored in a computer readable storage medium. The storage medium may be a ROM/RAM, a magnetic disk, or an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A character updating method in a system comprising a server and a client, the method comprising:
   at the server having one or more processors and memory storing programs executed by the one or more processors;
   receiving a character update request sent by the client, the character update request carrying a unicode of a character;
   searching for a file of which a name is same as the unicode of the character, the file being configured to store single character data, the single character data being obtained by resolving character data stored in a font into single character data; and
   sending the found file to the client, so that the client updates, according to the character data in the received file, a corresponding character, and
   at the client having one or more processors and memory storing programs executed by the one or more processors;
   acquiring a user-defined character;
   sending the character update request to the server in response to determining that a character that is same as the acquired user-defined character does not exist in a pre-configured character package, the character update request carrying the unicode of the character;
   receiving a file corresponding to single character data from the server, the single character data being based on a resolution of multiple character data, respectively corresponding to characters in a font, into the single character data, a name of the file being the unicode of the character; and
   updating, according to the character data in the received file, a corresponding character,
   wherein a first file that is obtained in a first-time character data resolution is stored in an existing character folder, and a second file obtained in a second-time or subsequent character data resolution is stored in an updated character folder, the second file that has been stored in the updated character folder for a period of time being moved to the existing character folder to ensure that a file stored in the updated character folder is an updated file,
   wherein, in response to the client sending a next character update request, the updated character folder is preferentially searched than the existing character folder for the file of which the name is the unicode of the character,
   wherein a character display engine is initialized to initialize the pre-configured character package, and based on the user-defined character that does not exist in the pre-configured character package being input in a to-be-displayed state, a preset character is used to replace the user-defined character before the file corresponding to the single character data is received, and the character display engine is configured to render the updated corresponding character after the file corresponding to the single character data is received, and wherein the determining comprises determining whether the character same as the acquired user-defined character exists in the pre-configured character package based on a character existence field indicating a result of such a determination.

2. The method according to claim 1, before the receiving the character update request, comprising:

resolving a data block that is in a font and comprises multiple character data into single character data, the data block storing unicodes of multiple characters and character data that corresponds to the unicodes of the multiple characters; and forming each character data into a file, wherein a name of the file is the unicode of the character.

3. The method according to claim 2, wherein the resolving the data block comprises:

parsing the data block that is in the font and comprises the multiple character data; and extracting, when currently parsed data is the unicode of the character, character data corresponding to the unicode of the character.

4. A character updating method, the method comprising:

at a client having one or more processors and memory storing programs executed by the one or more processors;

acquiring a user-defined character;

sending a character update request to a server in response to determining that a character that is same as the acquired user-defined character does not exist in a pre-configured character package, the character update request carrying a unicode of the character;

receiving a file corresponding to single character data from the server, the single character data being based on a resolution of multiple character data, respectively corresponding to characters in a font, into the single character data, a name of the file being the unicode of the character; and updating, according to the character data in the received file, a corresponding character, updated wherein a first file that is obtained in a first-time character data resolution is stored in an existing character folder, and a second file obtained in a second-time or subsequent character data resolution is stored in an updated character folder, the second file that has been stored in the updated character folder for a period of time being moved to the existing character folder to ensure that a file stored in the updated character folder is an updated file an updated file, wherein, in response to the client sending a next character update request, the updated character folder is preferentially searched than the existing character folder for the file of which the name is the unicode of the character, wherein a character display engine is initialized to initialize the pre-configured character package, and based on the user-defined character that does not exist in the pre-configured character package being input in a to-be-displayed state, a preset character is used to replace the user-defined character before the file corresponding to the single character data is received, and the character display engine is configured to render the updated corresponding character after the file corresponding to the single character data is received, and wherein the determining comprises determining whether the character same as the acquired user-defined character exists in the pre-configured character package based on a character existence field indicating a result of such a determination.

5. A non-transitory computer-readable storage medium having stored therein instructions that, when executed by a processor, cause the processor to perform a character updating method in a system comprising a server and a client, the method comprising:

at the server having one or more processors and memory storing programs executed by the one or more processors, receiving a character update request sent by the client, the character update request carrying a unicode of a character;

searching for a file of which a name is same as the unicode of the character, the file being configured to store single character data, the single character data being obtained by resolving character data stored in a font into the single character data; and sending the found file to the client, so that the client updates, according to the character data in the received file, a corresponding character, and at the client having one or more processors and memory storing programs executed by the one or more processors;

acquiring a user-defined character;

sending the character update request to the server in response to determining that a character that is same as the acquired user-defined character does not exist in a pre-configured character package, the character update request carrying the unicode of the character;

receiving a file corresponding to single character data from the server, the single character data being based on a resolution of multiple character data, respectively corresponding to characters in a font, into the single character data, a name of the file being the unicode of the character; and updating, according to the character data in the received file, a corresponding character, wherein a first file that is obtained in a first-time character data resolution is stored in an existing character folder, and a second file obtained in a second-time or subsequent character data resolution is stored in an updated character folder, the second file that has been stored in the updated character folder for a period of time being moved to the existing character folder to ensure that a file stored in the updated character folder is an updated file, wherein, in response to the client sending a next character update request, the updated character folder is preferentially searched than the existing character folder for the file of which the name is the unicode of the character, wherein a character display engine is initialized to initialize the pre-configured character package, and based on the user-defined character that does not exist in the pre-configured character package being input in a to-be-displayed state, a preset character is used to replace the user-defined character before the file corresponding to the single character data is received, and the character display engine is configured to render the updated corresponding character after the file corresponding to the single character data is received, and wherein the determining comprises determining whether the character same as the acquired user-defined character exists in the pre-configured character package based on a character existence field indicating a result of such a determination.

6. The non-transitory computer-readable storage medium according to claim 5, wherein the method further comprises, before receiving the character update request:

resolving a data block that is in a font and comprises multiple character data into single character data, the data block storing unicodes of multiple characters and character data that corresponds to the unicodes of the multiple characters; and forming each character data into a file, wherein a name of the file is the unicode of the character.

7. The non-transitory computer-readable storage medium according to claim 6, wherein the resolving the data block comprises:

parsing the data block that is in the font and comprises the multiple character data; and extracting, when currently parsed data is the unicode of the character, character data corresponding to the unicode of the character.

8. A non-transitory computer-readable storage medium having stored therein instructions that, when executed by a processor, cause the processor to perform:

acquiring a user-defined character;

sending a character update request to a server in response to determining that a character that is same as the acquired user-defined character does not exist in a pre-configured character package, the character update request carrying a unicode of the character;

receiving a file corresponding to single character data from the server, the single character data being based on a resolution of multiple character data, respectively corresponding to characters in a font, into the single character data, a name of the file being the unicode of the character;

updating, according to the character data in the received file, a corresponding character, wherein a first file that is obtained in a first-time character data resolution is stored in an existing character folder, and a second file obtained in a second-time or subsequent character data resolution is stored in an updated character folder, the second file that has been stored in the updated character folder for a period of time being moved to the existing character folder to ensure that a file stored in the updated character folder is an updated file, wherein, in response to the sending a next character update request, the updated character folder is preferentially searched than the existing character folder for the file of which the name is the unicode of the character, wherein a character display engine is initialized to initialize the pre-configured character package, and based on the user-defined character that does not exist in the pre-configured character package being input in a to-be-displayed state, a preset character is used to replace the user-defined character before the file corresponding to the single character data is received, and the character display engine is configured to render the updated corresponding character after the file corresponding to the single character data is received, and wherein the determining comprises determining whether the character same as the acquired user-defined character exists in the pre-configured character package based on a character existence field indicating a result of such a determination.

* * * * *